US006789046B1

(12) United States Patent
Murstein et al.

(10) Patent No.: US 6,789,046 B1
(45) Date of Patent: Sep. 7, 2004

(54) PERFORMANCE LOGGING SOLUTION

(75) Inventors: Michael S. Murstein, Kirkland, WA (US); Roger W. Sprague, Jr., Redmond, WA (US); Alexander M. Sutton, Seattle, WA (US); Michael W. Thomas, Bellevue, WA (US); Giedrius Zizys, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 09/730,338

(22) Filed: Dec. 5, 2000

(51) Int. Cl.[7] .......................... G06F 11/30; G06F 15/00
(52) U.S. Cl. .................................................... 702/182
(58) Field of Search ............................. 702/81, 83, 84, 702/182, 186; 707/10, 102; 709/201, 217, 224

(56) References Cited

U.S. PATENT DOCUMENTS

| | | | |
|---|---|---|---|
| 5,483,468 A | 1/1996 | Chen et al. ................. | 702/186 |
| 5,581,482 A | 12/1996 | Wiedenman et al. ....... | 702/186 |
| 5,923,874 A | 7/1999 | Koenig ....................... | 709/100 |
| 5,966,706 A | 10/1999 | Biliris et al. ................. | 707/10 |
| 6,049,798 A | 4/2000 | Bishop et al. ................ | 707/10 |
| 2002/0069037 A1 * | 6/2002 | Hendrickson et al. ...... | 702/186 |
| 2003/0086536 A1 * | 5/2003 | Salzberg et al. ......... | 379/15.02 |

OTHER PUBLICATIONS

Bulterman, D.C.A., et al., "Application–level Performance Prediction Tools for Network–Based Systems", IEEE Network, vol. 1, No. 3, Jul. 1987, p. 6–12.

Chug–Sing Yang, et al., "Efficient Content Placement and Management on Cluster–Based Web Servers", NOMS 2000, 2000 IEEE/IFIP Network Operations and Management Symposium 'The Networked Planet: Management Beyond 2000', Apr. 10–14, 2000, p. 463–473.

Kopp, C., "Managing Cluster Computers", Dr. Dopp's Journal, vol. 25, No. 7, Jul. 2000, p. 21–31.

Ledeczi, A., et al., "Synthesis of Self–Adaptive Software", 2000 IEEE Aerospace Conference Proceedings, vol. 4, Mar. 18–25, 2000, p. 501–507.

Lusiani, A., "Process to Process Communication Over Fast-bus in the Data Acquisition System of the ALEPH TPC", IEEE Transactions on Nuclear Science, vol. 14, No. 1, pt. 1, Feb. 1994, p. 138–141.

(List continued on next page.)

Primary Examiner—Michael Nghiem
(74) Attorney, Agent, or Firm—Amin & Turocy LLP

(57) ABSTRACT

A system and method is provided for monitoring, gathering and aggregating performance metrics of a plurality of members configured as an entity. Configurable performance metric settings can be set at a first computer (e.g., a first member) and dynamically propagated to all members of the entity to establish performance metric configuration settings at each of the plurality of members. In one aspect of the invention, a system and method log performance metric data periodically at a predefined time period and resolution at a plurality of members for one or more performance metrics. The performance metric data values logged at the predefined time period and resolution are aggregated to data sets of at least one larger time period and resolution. Valid performance data values of similar time periods and resolutions are then gathered from the plurality of members and aggregated over the entity to provide a unified result set for the entity.

25 Claims, 10 Drawing Sheets

OTHER PUBLICATIONS

Mas, C., et al., "*An Efficient Algorithm for Locating Soft and Hard Failures in WDM networks*", *IEEE Journal on Selected Areas in Communications,* vol. 18, No. 10, Oct. 2000, p. 1900–1911.

Roth, C., et al., "*PowerPC/sup TM/Performance Monitor Evolution*", 1997 *IEEE International Performance, Computing and Communications Conference,* Feb. 5–7, 1997, p. 331–336.

Yew–Huey Liu, et al., "*A Distributed Connection Manager Interface for Web Services on IBM SP Systems*", *Proceedings. 1996 International Conference on Parallel and Distributed Systems,* 306 Jun. 1996, p. 2–9.

"Microsoft Windows Management Instrumentation Scripting", http://msdn.microsoft.com/library/backgrnd/html/wmiscript.htm, Apr. 1999, (18 pages).

* cited by examiner

PERFORMANCE LOGGING SOLUTION

TECHNICAL FIELD

The present invention relates generally to computer systems, and more particularly to a system and method for gathering and aggregating performance metrics of a plurality of computers cooperating as an entity wherein the entity may be interfaced collectively as a whole and/or individually. Additionally, the system and method may be employed to gather and aggregate performance metrics of a plurality of entities cooperating as a higher entity where a parent entity may be interfaced directly or as part of an even higher collection of parent entities. The gathering of performance metrics is hierarchical with no predefined limits.

BACKGROUND OF THE INVENTION

With the advent of Internet applications, computing system requirements and demands have increased dramatically. Many businesses, for example, have made important investments relating to Internet technology to support growing electronic businesses such as E-Commerce. Since companies are relying on an ever increasing amount of network commerce to support their businesses, computing systems generally have become more complex in order to substantially ensure that servers providing network services never fail. Consequently, system reliability is an important aspect to the modem business model.

A first approach for providing powerful and reliable services may be associated with a large multiprocessor system (e.g., mainframe) for managing a server, for example. Since more than one processor may be involved within a large system, services may continue even if one of the plurality of processors fail. Unfortunately, these large systems may be extraordinarily expensive and may be available to only the largest of corporations. A second approach for providing services may involve employing a plurality of lesser expensive systems (e.g., off the shelf PC) individually configured as an array to support the desired service. Although these systems may provide a more economical hardware solution, system management and administration of individual servers is generally more complex and time consuming.

Currently, management of a plurality of servers is a time intensive and problematic endeavor. For example, managing server content (e.g., software, configuration, data files, components, etc.) requires administrators to explicitly distribute (e.g., manually and/or through custom script files) new or updated content and/or configurations (e.g., web server configuration, network settings, etc.) across the servers. If a server's content becomes corrupted, an administrator often has no automatic means of monitoring or correcting the problem. Furthermore, configuration, load-balance adjusting/load balance tool selection, and monitoring generally must be achieved via separate applications. Thus, management of the entity (e.g., plurality of computers acting collectively) as a whole generally requires individual configuration of loosely coupled servers whereby errors and time expended are increased.

Presently, there is not a straightforward and efficient system and/or process for providing system wide performance metric data of the collection of servers. Additionally, there is no system and/or process for providing system wide performance metric data of a collection of arrays of servers. Some applications may exist that provide performance metrics of an individual server, however, these applications generally do not provide performance metrics across the logical collection of loosely coupled servers. For example, many times it is important to view information from the collection of servers to determine relevant system-wide performance. Thus, getting a quick response view of pertinent performance metrics associated with the plurality of serves may be problematic, however, since each server generally must be searched independently. Downloading all performance metric information from each individual server would overwhelm the network and be extremely cumbersome to an administrator to review all of the performance metric information to find problems or determine a state of the array. Furthermore, the complexity would be substantially increased for a collection of arrays.

SUMMARY OF THE INVENTION

The present invention relates to a system and method of monitoring, gathering and aggregating performance metrics for a plurality of entities configured as a single entity. For example, the entities may include a plurality of members (e.g., computers, servers, clusters) collectively cooperating as a whole. In accordance with the present invention, a system interface is provided wherein a consistent and unified result set of performance information of a plurality of the entities as a whole may be obtained from any of the members associated with the entity. The system and method provides for configuration settings to be provided on a single computer or member wherein the configuration setting information (e.g., performance information to be logged) is propagated or replicated to each member of the entity. The configuration setting information is then employed by each member for determining which performance metric types (e.g., counters) to log. The members are notified of any changes to the configuration settings and a performance monitoring system dynamically adjusts the performance metric type logging accordingly.

In one aspect of the invention, the performance metric types are logged to a data store based on a predefined time period and resolution for each member. The data is then dynamically aggregated to data of larger time periods and larger time resolutions. This is accomplished by performing mathematical operation on the data values of the data points for the predefined time period and time resolution to provide data points of higher time periods and time resolutions for each performance metric being logged. A performance gathering and aggregation system is provided that receives requests from a source or requestor to receive performance metric data of a single member or of the entity as a whole. The data gathering and aggregation system provides a request to a query component, which queries the members for the data values for the particular time period and resolution stored in the data store and passes the results to the data gathering and aggregation system. The performance gathering and aggregation system aggregates and formats the results for transmitting to the requestor. The query component includes error handling for handling members that are non-responsive or send invalid results. If performance metrics information has been requested for the entity as a whole, the performance gathering and aggregation system matches up data point values with respect to time for each member that provides valid results and provides aggregated data values for each time point over a specified time period and time resolution to the requestor. The data is aggregated by performing mathematical operations on each time data point for a particular metric type for each entity that provides valid performance data.

The following description and the annexed drawings set forth in detail certain illustrative aspects of the invention.

These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
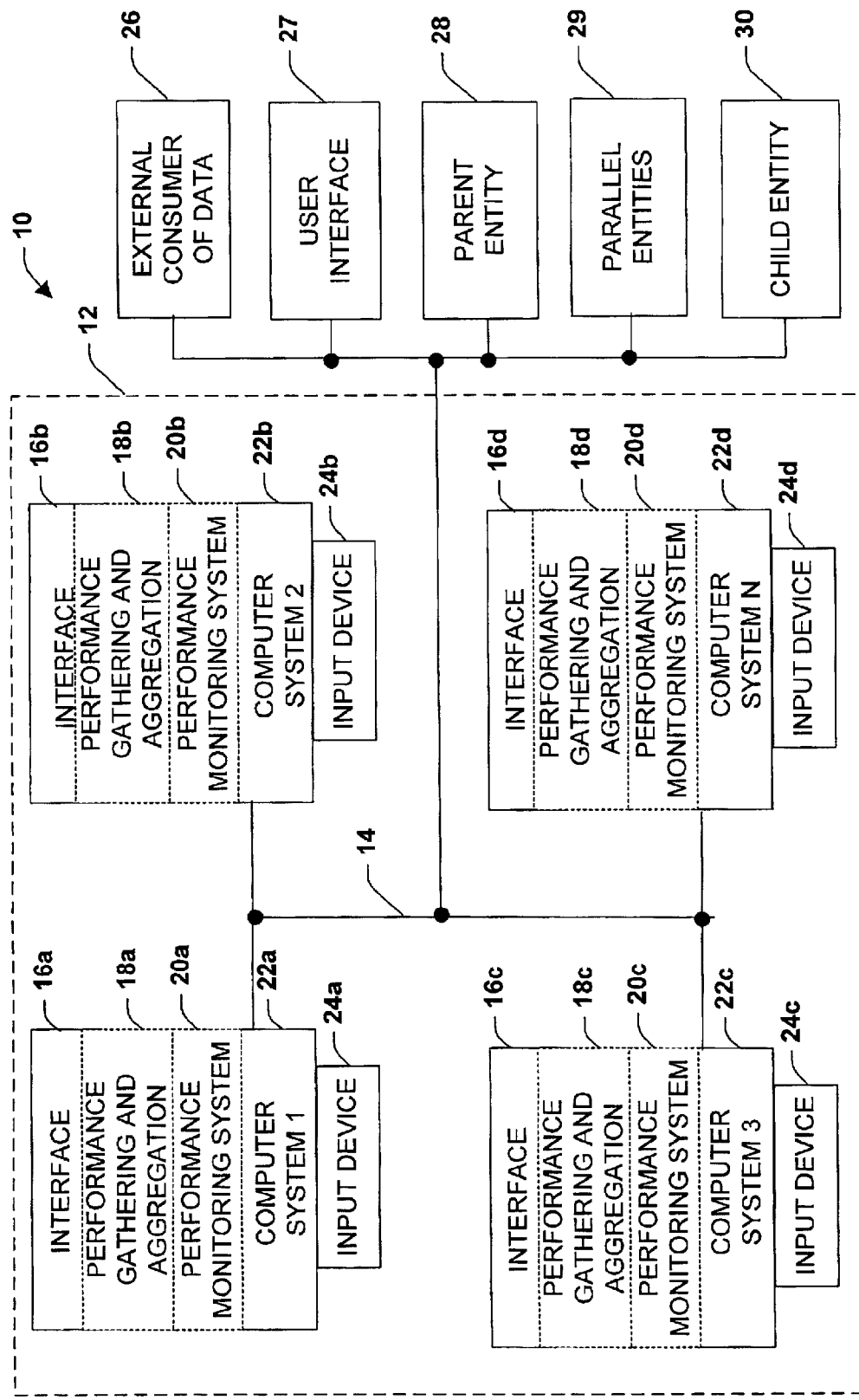
FIG. 1 illustrates a schematic block diagram illustrating a performance gathering and aggregation system of an entity in accordance with one aspect of the present invention.

The present invention is now described with reference to the drawings, wherein like reference numerals are used to refer to like elements throughout. The present invention is described with reference to a system and method for monitoring, gathering and aggregating performance data of a plurality of members forming an entity. The performance data to be logged is defined by a configuration setting at any member of the entity and this information replicated to other members of the entity. Each member monitors its performance data and logs this data locally to a data store based on a redefined time period and time resolution. The performance data of the predefined time period and time resolution is then aggregated to a plurality of data sets of larger time periods and time resolutions.

An interface can then request performance data from the members via a performance gathering and aggregation system. The performance gathering and aggregation system requests or queries the plurality of member for performance data for a performance metric type via a query component. The performance gathering and aggregation system receives performance data from the members based on a requested time period and resolution and a performance metric type. The request can be either for a single member or from all members of the entity. The performance gathering and aggregation system will then aggregate and format performance data for the particular performance metric type based on the requested time period and resolution. If the request is for receiving the performance metric type for the entity, the performance gathering and aggregation system will aggregate the performance data values of similar time points to provide a unified performance result set for the entity over the particular time period and resolution. The unified result set is then returned to the requestor.

In accordance with the present invention, a performance system is provided that greatly facilitates management and administration of an entity. The performance system substantially automates performance information retrieval by enabling an application to retrieve the performance metric data of the entity from any of a plurality of systems operatively coupled to the entity. A consistent experience is therefore provided wherein the performance metric data of the entity may be retrieved as if the entity were a singular machine—thereby providing a substantial improvement over conventional systems that may require an administrator to individually retrieve performance metric data from each machine comprising the entity. Thus, the present invention saves time and administration costs associated with conventional systems. Moreover, system troubleshooting is improved since entity members may be considered upon as a collective whole (e.g., retrieving system wide performance) and/or individual members may be identified and operated upon.

Referring initially to FIG. 1, a system 10 illustrates a particular aspect of the present invention related to a performance system for monitoring, gathering and aggregating performance metrics of a plurality of systems cooperating as an entity. A plurality of systems (e.g., computers, servers, machines) for example, computer systems 1 through N (N being an integer) 22a through 22d may be operatively coupled to a network 14 thereby forming an entity 12. Other sources that may not be part of the entity 12, may also be coupled to the network 14 for retrieving, gathering and aggregating performance metric data from the entity 12 or for gathering and aggregating performance raw metric data from the entity 12 by employing its own gathering and aggregation system. For example, an external consumer of data 26 can connect to one of the computer systems 22 through the network 14 to retrieve raw or aggregated performance metric data or connect to one of the interfaces 16a through 16d to retrieve raw or aggregated performance metric data. Additionally, an external user interface 27 can connect to one of the computer systems 22 through the network 14 to retrieve raw or aggregated performance metric data or connect to one of the interfaces 16a through 16d to retrieve raw or aggregated metric data. Furthermore, a parent entity 28, parallel entities 29 and/or a child entity 30 can connect to any member of the entity for retrieving and passing performance metric data between entities for gathering and/or aggregating. In order to request and provide specific gathered and aggregated operation performance information of the entity 12, a plurality of interfaces (e.g., computer monitor) 16a through 16d may provide output, and an input device (e.g., mouse, keyboard) 24a through 24d may provide input requests to the operation gathering and aggregation system 18a through 18d.

As depicted by the system 10, the interface 16 enables an application or process to retrieve, display or monitor the entity 12 from each member 22a–22d and/or from non-members such as any of the components 26–30. The interface 16 provides a consistent interface for an application or process to measure the operational performance metrics of the entity 12 as if it was a singular machine. Consequently, the user does not have to administer (e.g., gain access to each machine) and configure (e.g., download new content/software) each machine individually. Thus, time is saved and errors are mitigated. It is noted that the interface 16 generally does not have to run on each computer in the system 10. As win be described in more detail below, full entity operation monitoring may be achieved by interfacing to a single member, for example.

The interface 16 may be served with information provided from each member 22a through 22d employing any of the performance gathering and aggregation systems 18a through 18d. This may be achieved by enabling each member to distribute information to the entity 12. Therefore, the interface 16 may provide aggregated performance information of the entity as a whole through the performance gathering and aggregation system 18—in contrast to conventional systems wherein performance information of a member may be received and/or displayed only at the individual member employing a performance monitoring system 20a–20d. For example, computer systems 22a–22d processor performance may be retrieved and/or displayed as an aggregation of the output of each member of the entity 12. Any of the interfaces 16a through 16d may be provided with a similar consistent result set. It is noted that the members 22a through 22d may also be entities. For example, some members could also be a collection of members represented by an entity. Thus, the entity 12 may include members that are entities in their own right.

Alternatively, the interface 16 is provided with individual operational performance metrics from any of the performance gathering and aggregation systems 18a through 18d by requesting this information from that particular member. Furthermore, entity configurations may be modified from any of the interfaces 16 by enabling the user to provide input to the interface and thereby distribute resultant modifications throughout the entity 12. This may be achieved for example, by providing the input to a single member wherein the single member may then distribute the modified configuration throughout the entity 12. It is to be appreciated that other distribution systems may be provided. For example, rather than have entity operation information centrally distributed and aggregated at the single member, individual members 22a–22d may share a master file (e.g., XML) describing the configuration information of each member.

Figure 2:
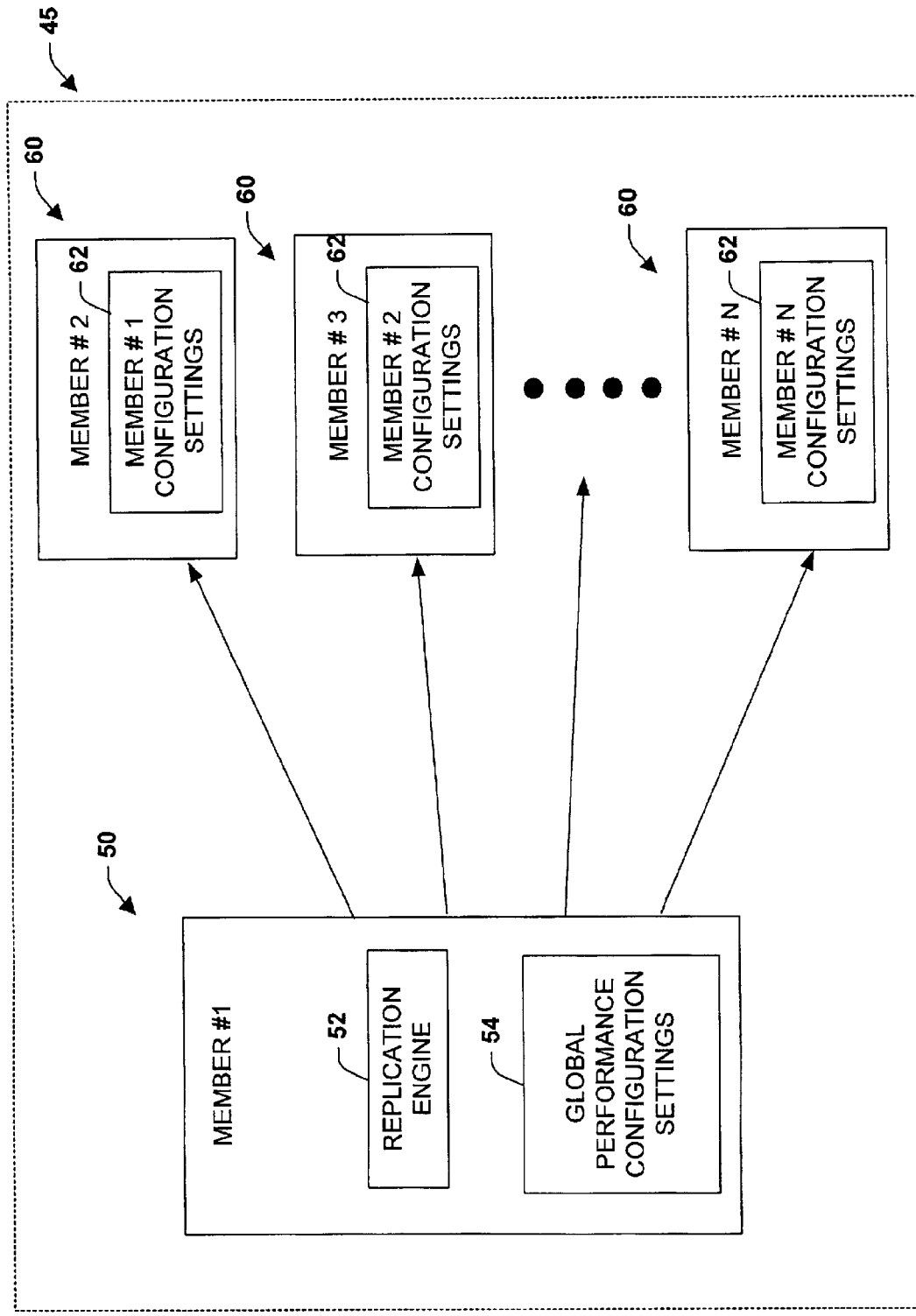
FIG. 2 is a schematic block diagram illustrating replication of performance configuration settings of an entity in accordance with one aspect of the present invention.

FIG. 2 illustrates entity configuration with respect to configuration of the types of performance metrics that are to be monitored by members of the entity, so that there is uniformity throughout the entity of the types of metrics to be monitored. This uniformity allows for performance information to be monitored and retrieved for not only individual members, but also for the entity as a whole. An entity 45 is provided having a first member 50 and a plurality of additional members 60 coupled to the first member 50. The first member 50 includes global performance configurations settings 54 and the members 60 include member specific configurations settings 62. Setting of the performance metric types to be logged in the global performance configuration settings 54 on the first member 50 provides for propagation of these settings to the configuration settings 62 of the members 60. This is accomplished by employing a replication engine 52. This provides for logging of the same performance metrics for each member 60 of the entity 45. Any change to the global performance configuration settings 54 causes the member configuration settings to be dynamically updated. It is to be appreciated that the global performance configuration settings may be set at any of the plurality of members of the entity and the setting propagated to the other members.

Figure 3:
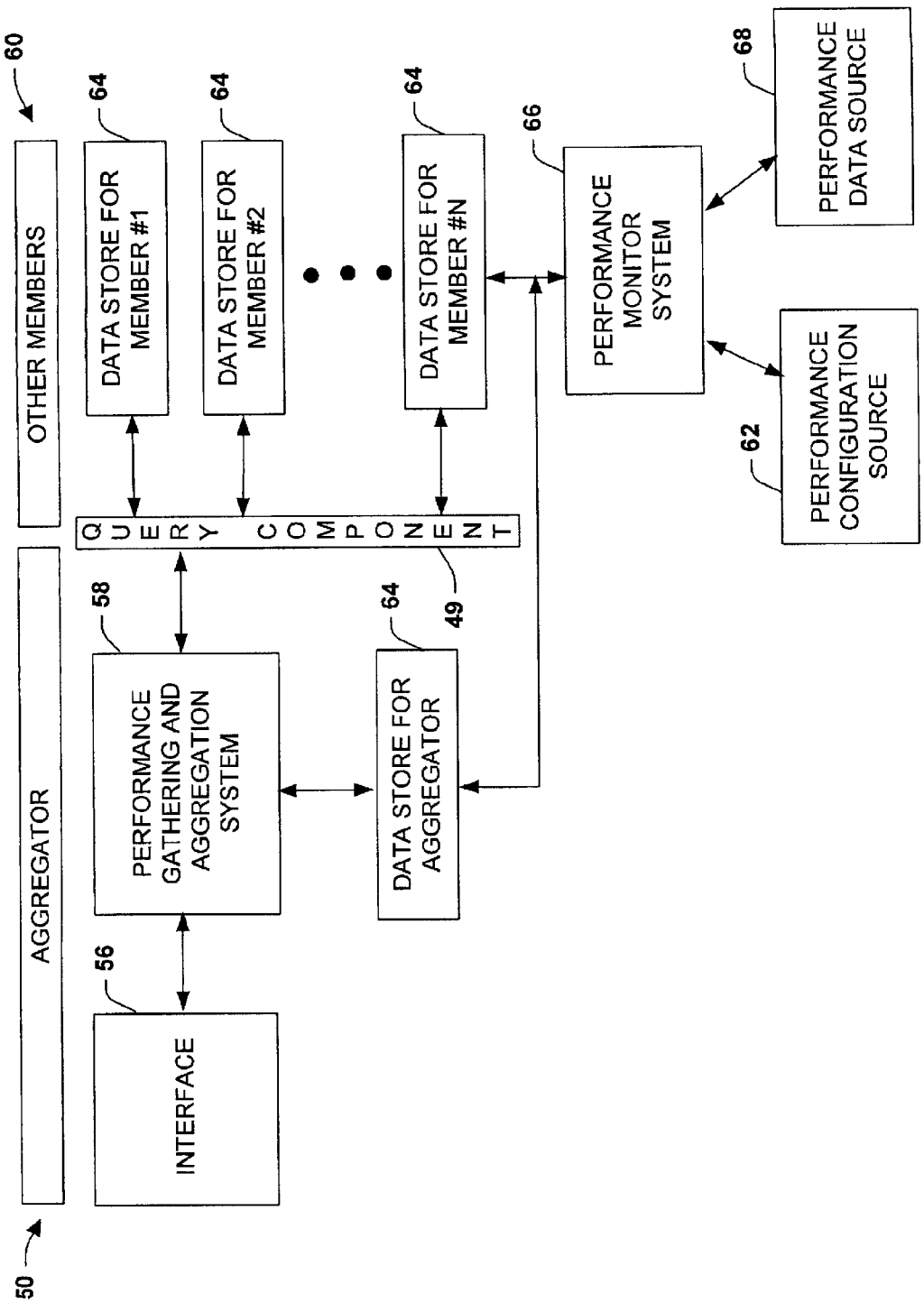
FIG. 3 is a schematic block diagram illustrating performance monitoring and performance gathering and aggregation of an entity in accordance with one aspect of the present invention.

FIG. 3 illustrates a block schematic view of the components employed to provide both a singular member result set of performance metric information and an aggregates entity result set of performance metric information utilizing the performance system of the present invention. Each member 60 and an aggregator member 50 can include a performance monitor system 66 coupled to a performance configuration source 62 and a performance data source 68. The performance monitor system 66 utilizes the configuration setting information in the performance configuration source 62 to determine the different performance metrics to log. The performance monitor system 66 periodically retrieves the performance data values of the different performance metrics from the performance data source 68. The performance monitor system 66 then periodically logs the performance data values in the data store 64 related to that particular member. The performance metric data values are repeatedly logged based on a predefined time period and time resolution, until the configurations settings are changed. It is to be appreciated that component(s) may reside between the performance monitor system 66 and the data store 64 for setting up communication links, accessing data and/or transforming data.

The performance monitor system 66 also dynamically aggregates the performance metric data values based on the predefined time period and time resolution to data sets of higher time periods and higher time resolution (e.g., 10 seconds, 1 minute, 15 minutes, 1 hour, 1 day) (e.g., aggregates across time, hereinafter referred to as "time aggregation"). The aggregation of data reduces the amount of storage required in addition to increasing the speed of the queries and the user interface. Various mathematical methodologies may be employed to perform time aggregation. For example, for an aggregation from ten seconds to one minute, the performance data values would include six points. The data values of these six points could be aggregated to a minute by taking the average, the minimum, the maximum, the last, the weighted average or some other value of the data values of these six points for supplying the one minute data value.

An interface 56 can provide a request to a performance aggregation system 58 for performance data for a particular performance metric over a particular time period and time resolution based on a single member result set or based on an aggregated result set of the performance data values over the entire entity. If the interface 56 is a user interface, it may be constrained by the number of data points that can be plotted, therefore, interpolation of the data to smaller sets can be done at query time or by database aggregation. The performance gathering and aggregation system 58 requests this information from the data stores 64 through a query component 49. The query component 49 includes error handling. For example, if a member is not available results are returned from the other members and aggregated appropriately, while an error is returned for the unavailable member, which is not utilized to provide the aggregated results. For example, the query component 49 can pass back a value of −1 when no data is available for a respective member. The performance gathering and aggregation system 58 takes into account data not available. Furthermore, the interface 56 can be operable to properly convey the error data. The interface 56 may also be operable to provide selectability for which performance metrics to be returned to the interface 56.

It is to be appreciated that component(s) may reside between the performance gathering and aggregation system 58 and the query component 49 for setting up communication links, accessing data and/or transforming data. The performance metric data is provided to the performance gathering and aggregation system 58 for the particular metric requested. The performance gathering and aggregation system 58 can transform the data points to fit within a particular time period and resolution. If the performance metric data is to be returned for the entire entity, the performance gathering and aggregation system collapses or aggregates the performance metric data values for time points within the specified time period and time resolution for each member submitting data values (e.g., aggregates across members, hereinafter referred to as "entity aggregation"). Various mathematical methodologies may be employed to perform entity aggregation. For example, for an aggregation of 4 members, the performance data values for each time data point would include four points. The data values of these four points could be aggregated by taking the average, the minimum, the maximum, the last, the weighted average or some other value of the data values of these four points for supplying a single aggregated data value for the entity for that particular time point. The above methodology can be repeated for all time data points within the specified time period and time resolution.

It is to be appreciated that not all members will return data values or have data values for a particular point in time. In this situation, the gathering and aggregation system 58 disregards the data value and determines an appropriate aggregated data value on data values considered valid that were returned by the members and ignores the invalid data values in the aggregation.

Figure 4A:
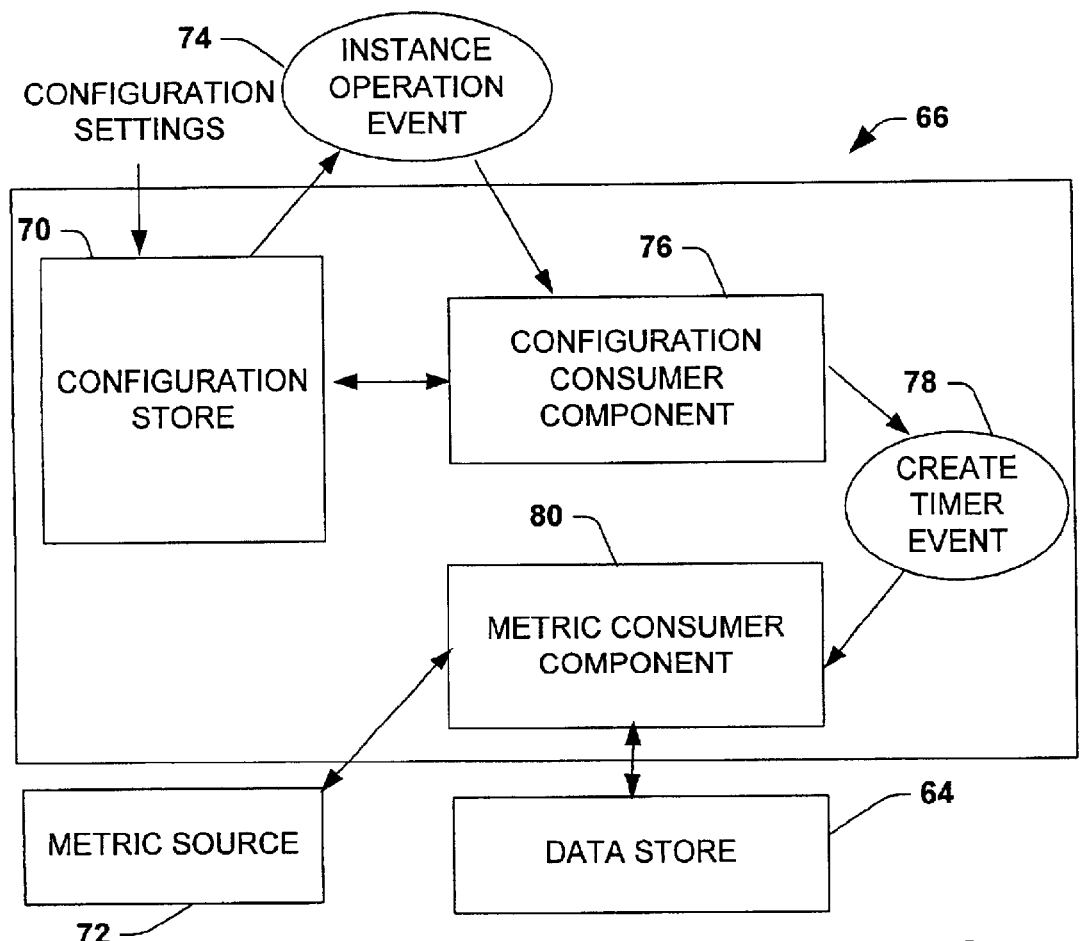
FIG. 4a is a schematic block diagram illustrating operation of a performance monitor system in accordance with one aspect of the present invention.

FIG. 4a illustrates a block schematic diagram of the operation of the performance monitor system 66. The performance monitor system 66 includes a configuration store 70, a configuration consumer component 76 and a metric consumer component 80. Configuration settings are transmitted to the configuration store 70 from the member itself or from another member of the entity. Any changes in the configuration settings to the configuration store 70 causes an instance operation event 74 to notify the configuration consumer component 76 that there has been a change in the configuration settings. The configuration consumer component 76 determines any changes, additions or deletion to the metrics being logged. The configuration consumer component 76 creates and updates an active metrics table (e.g., list of metrics currently being logged). If changes to global configuration class indicate that logging is turned on, the configuration consumer component 76 creates an event timer 78 that periodically informs the counter consumer component 80 to update the data store 64 with the current metric values. The counter consumer component 80 queries a metric source 72 periodically and logs the metric data to the data store 64 based on a predefined time period and time resolution defined by the timer event 78.

The metric source 72 could be any of a variety of metric data source types based on an operating system environment. For example, in the Microsoft® Windows® Operating System environment, the metric data source type could be Windows Management Instrumentation (WMI), which is a support mechanism for management of systems in an enterprise. WMI allows developers to use a simple, consistent mechanism to query for information on computers across an enterprise (e.g., hardware settings, performance information, driver configuration, BIOS information, application settings, event log information). WMI allows for both hardware and software to be modeled. It is to be appreciated that other computer management systems that provide performance metric information may be employed to carry out the present invention.

The metric consumer component 80 could employ any of a variety of services to query performance information from the metric source component 72. Additionally, the metric source could be a variety of metric source types based on an operating system environment. For example, in Microsoft® Windows® Operating System environment, the metric consumer component 80 could employ performance data helper (PDH) and the metric source 72 could be the performance library (PERFLIB), which is a dynamically linked library residing on the Microsoft® Windows® Operating System. The metric consumer component 80 then stores the metric information in the data store 64. If changes to global configuration class indicate that logging is turned off, the configuration consumer component 76 deletes the event timer 78 and logging is ceased.

Figure 4B:
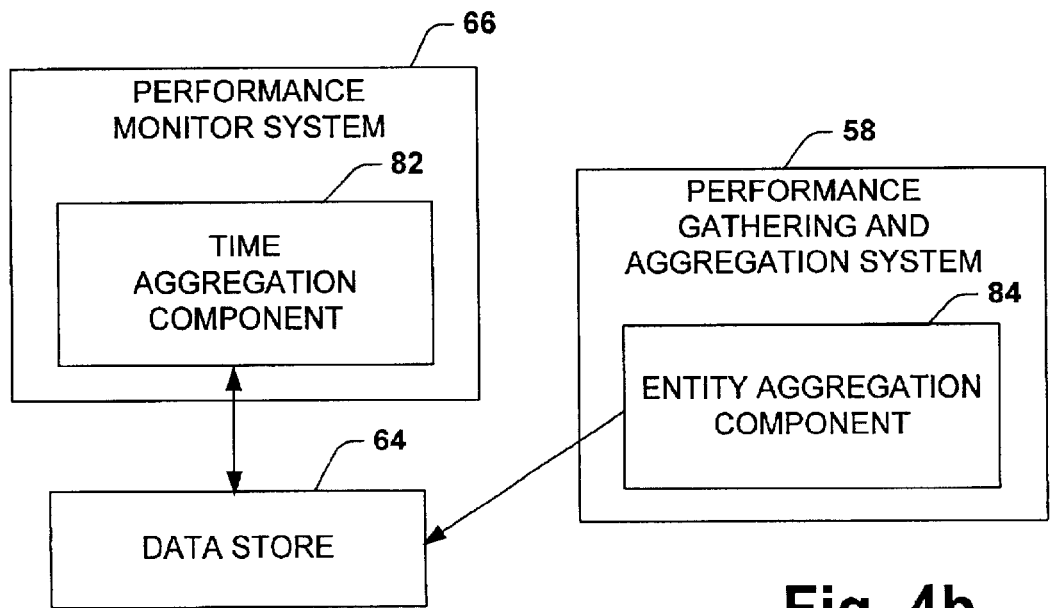
FIG. 4b is a schematic block diagram illustrating member time aggregation and entity data aggregation in accordance with one aspect of the present invention.
Figure 5:
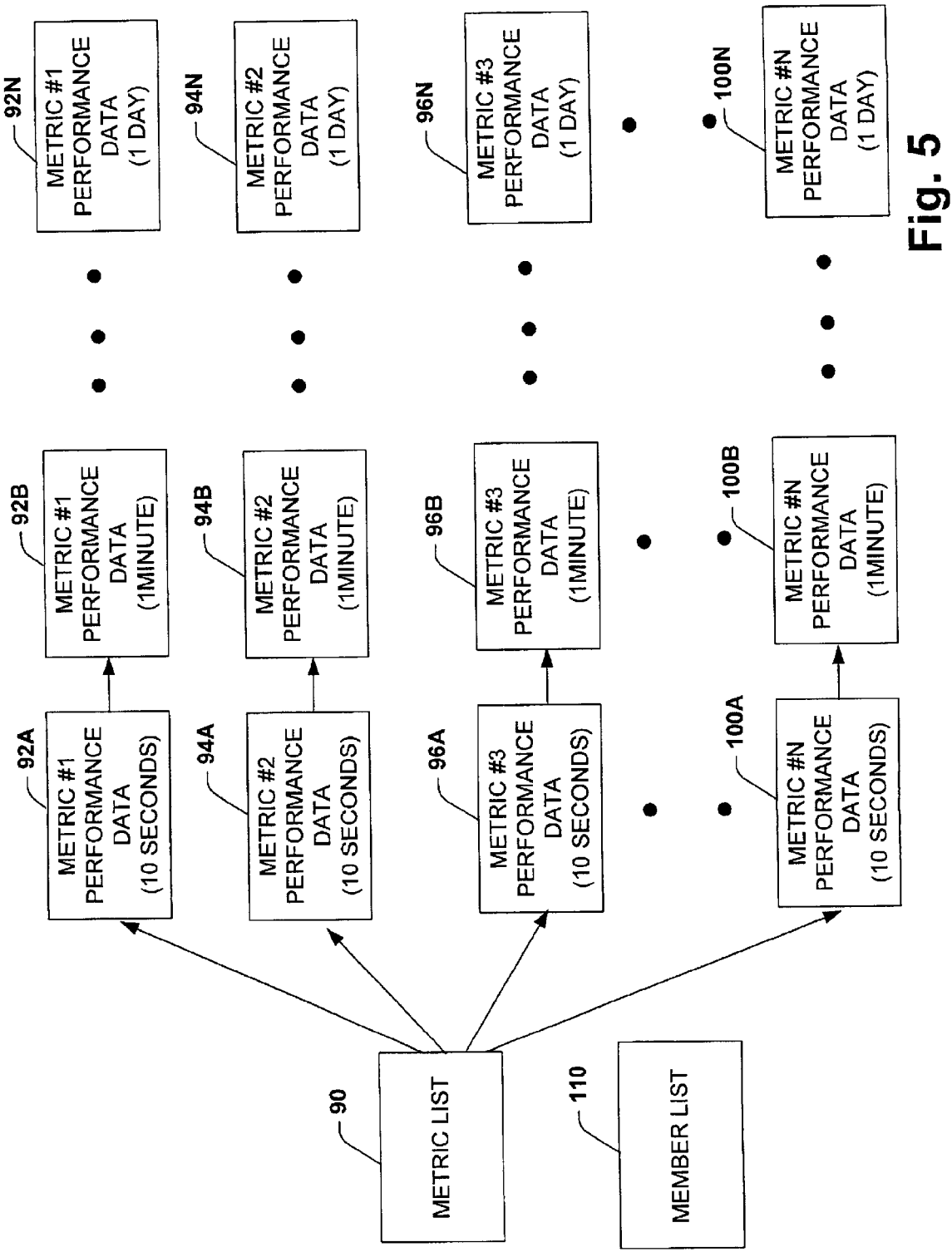
FIG. 5 is a block diagram illustrating aggregation with respect to time of performance data for different time periods and resolutions residing in a data store in accordance with one aspect of the present invention.

FIG. 4b illustrates a block schematic diagram of the operation of the performance monitor system 66 in cooperation with the performance gathering and aggregation system 58. As previously described, the performance monitor system 66 logs performance metric data periodically based on the configuration settings and the event timer setting. The performance metric data is stored in separate predefined time period and time resolution data sets for each metric being logged. The performance data stored for each metric is based on a time period of the timer event 78. The performance monitor system 66 includes a member time aggregation component 82, which dynamically collapses or aggregates data to additional data sets based on larger time periods and larger time resolutions from a first data set based on the predefined time period and time resolution. For example, FIG. 5 illustrates a number of stored data sets residing in the data store 64. The performance monitor system 66 logs a metric list 90, a member list 110 and ten second performance data stored for each metric being logged. The ten second performance metric data is stored for metric #1 92A, metric #2 94A, metric #3 96A up to metric #N 100A. The ten second performance metric data includes performance metric data logged every ten seconds defined by the event timer or the like. The time aggregation component 82 then dynamically collapses or aggregates performance metric data to data sets of larger time periods and resolutions employing the ten second tables. FIG. 5 illustrates that the ten second data being aggregated up to one minute performance metric data sets 92B, 94B, 96B up to 100B, which is then aggregated to additional performance metric data sets, all the way up to one day performance metric data sets 92N, 94N, 96N up to 100N.

Referring again to FIG. 4b, the performance data gathering and aggregation system 58 includes an entity aggregation component 84. The performance data gathering and aggregation system 58 will receive a request from a source (e.g., the interface component 16 to receive performance information on a metric over a certain time period and time resolution for either a particular member or for the entity as a whole. The performance gathering and aggregation system 58 will then access or query a particular performance metric data set relating to the time period and time resolution to be received for that performance metric over a single member or over all members. If the request is for performance metric data for the entity, the entity aggregation component 84 will aggregate the metric data over the members to find a single metric value for each time data point. The aggregated values will then be transformed to appropriate data points for the particular time resolution requested. The aggregated and transformed values will then be transmitted back to the source requesting the data.

Figure 6A:
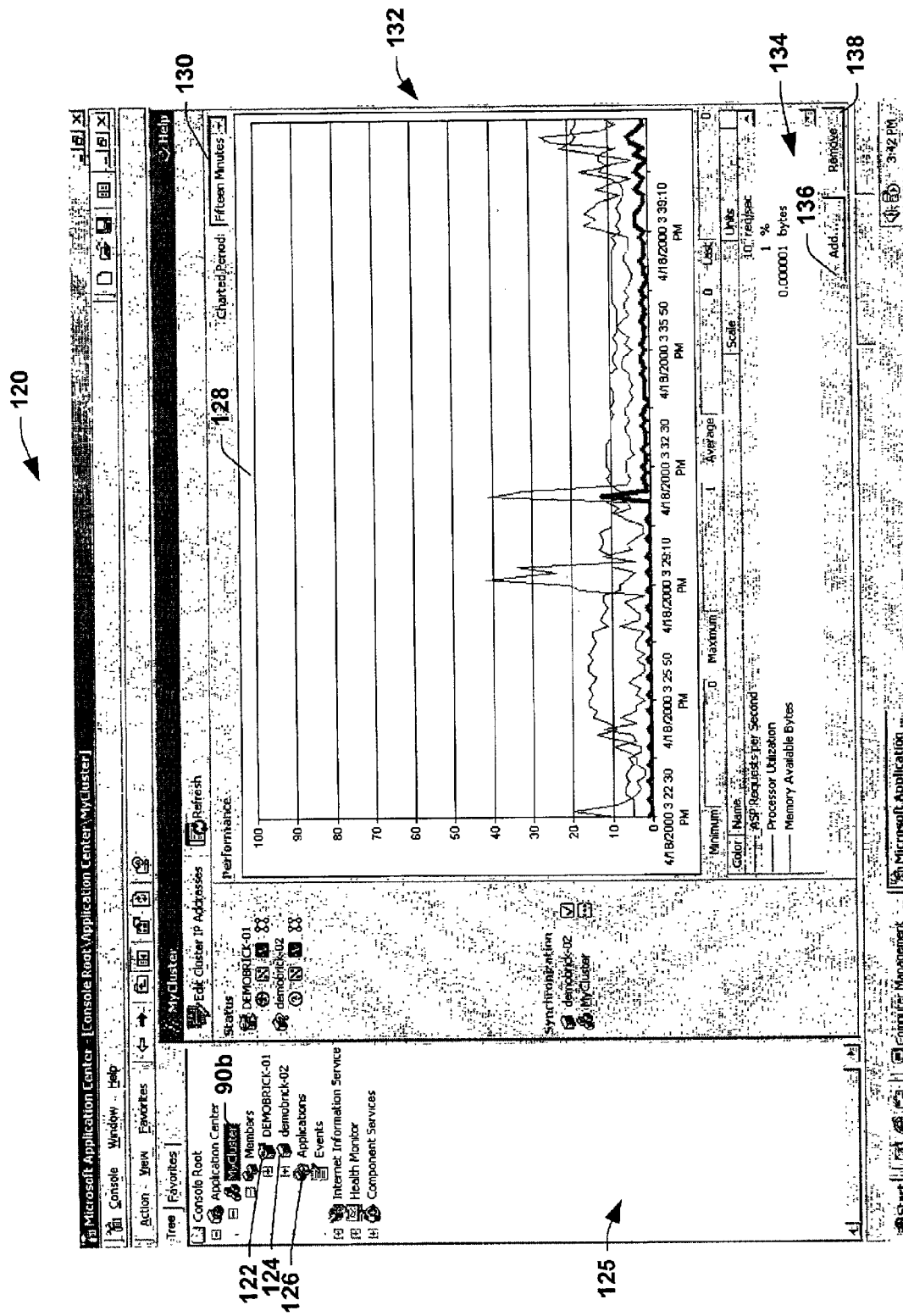
FIGS. 6a and 6b illustrate entity and member performance interface displays in accordance with one aspect of the present invention.
Figure 6B:
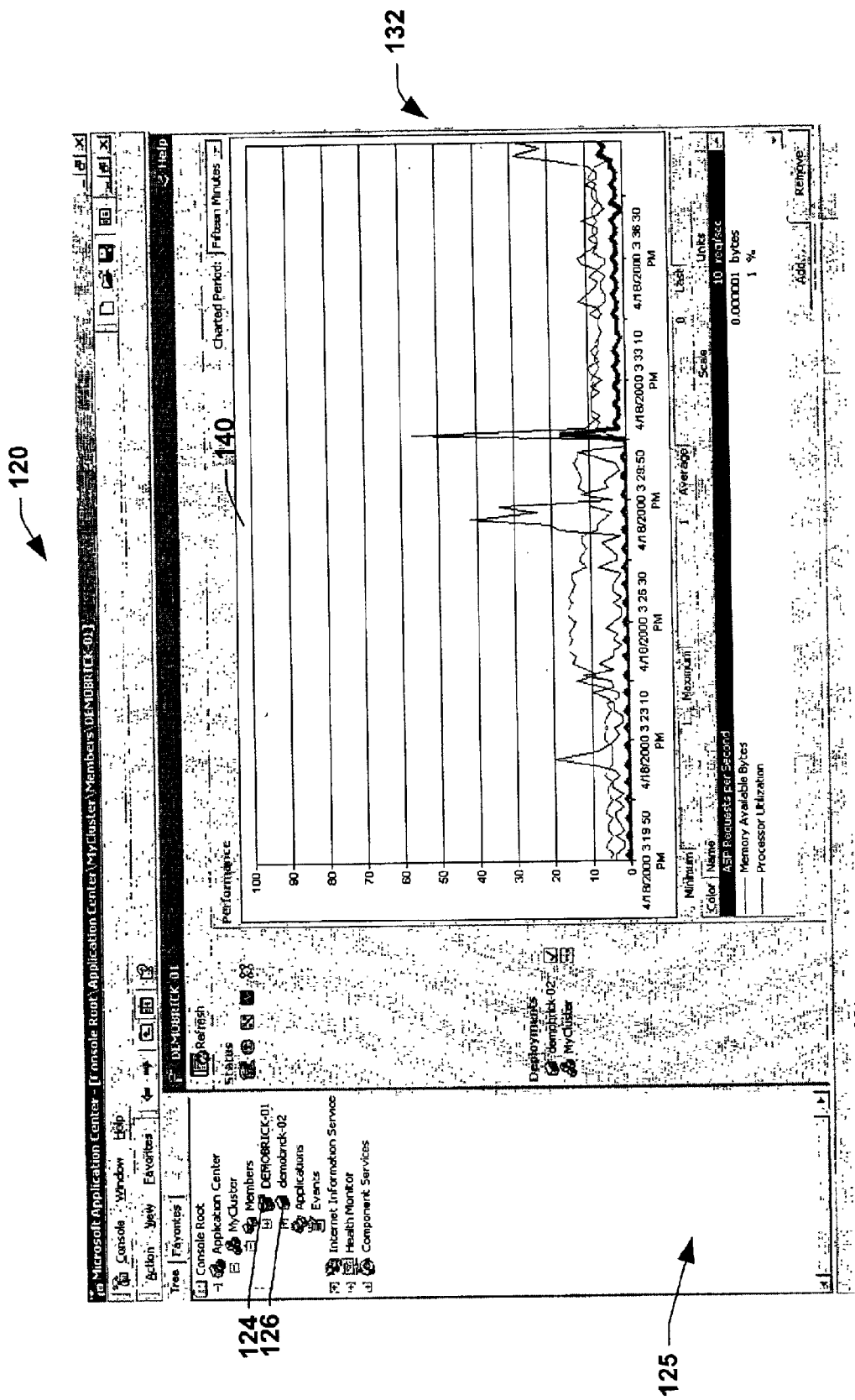

Referring now to FIGS. 6a and 6b, a particular example is illustrated where the interface component 16 is a user interface adapted to display performance metric data graphically over a particular time period and time resolution. A user interface 120 is provided for viewing performance metric data for either a single member or for an entity as a whole. The user interface 120 includes a scope pane 125 and a results pane 132. FIG. 6a depicts an entity wide view 128 and FIG. 6b depicts a member view 140, respectively. Referring to FIG. 6a, the entity wide view 128 may be selected via a mouse for example by selecting display object 122 (e.g., entity node MyCluster). From the scope pane 125, a user may then navigate to a plurality of pages (e.g., displayed in the results pane 132 and/or via other menus) that provide performance and status views of the entity as a whole. Referring briefly to FIG. 6b, the members view 140 may be provided to enable a user to view pages associated with a particular member by selecting display objects in the scope pane 125 associated with that particular member (e.g., by selecting display object 124 or 126).

As described above in relation to FIG. 6a, an entity node display object 122 may be provided to display and enable selection of an entity. It is to be appreciated that a plurality of entities having associated members may be defined. In order to facilitate management and navigation, each member (e.g., member node display objects 124 and 126) may be presented in the entity node view. For example, demobrick-01 and demobrick-02 represent member nodes 124 and 126, and appear under entity node 122—MyCluster. The entity node view 122 may be independent of each member's actual topology and additionally may allow for the inclusion of members that are not part of the same subnet, domain, and/or physically near.

The user interface 120 may provide performance views to enable a user to display to a chart control (e.g., performance counters). The performance metric data may be aggregated for the entity and/or related to a specific member. If a user selects an entity wide view as described above, a performance metric display 128 may be provided as depicted in the results pane 132. As illustrated in the scope pane 125, an entity node 122 may be highlighted indicating to the user that metric information is provided as an aggregated set from members 124 and 126. As illustrated in the display output 128 performance metric information for the entity may be aggregated and displayed. The aggregated information may be provided from a plurality of sources such as from metrics associated with performance aspects of members serving the entity. For example, a second display output window 134 may provide information regarding particular metrics such as processor utilization, memory available, and server requests per second. Inputs 136 and 138 (e.g., Add/Remove) may be provided to add and remove metrics from the display 128 respectively. For example, if input Add 136 were selected, a list (not shown) may be provided to enable the user to select a performance metric for display output. Similarly, counters may be removed by selecting (e.g., mouse highlighting) a metric within the display 134 and then selecting the Remove input 138.

A selection input/output 130 (e.g., rectangle with selection arrow) may be provided to enable the user to see and/or select a suitable time period for monitoring the aggregated data described above. As the time period is modified, the resolution of the display output 128 may thereby be altered accordingly. FIG. 6b illustrates a view similar to FIG. 6a, however, the display output 140 is directed from a particular member. As shown in the scope pane 125, demobrick-01 124 may be highlighted to indicate that data is provided from a member. The change in selection of any member or addition of a metric to a current screen causes the user interface to send a request to the data gathering and aggregation system 58. The data gathering and aggregation system 58 then performs the functions as previously discussed and returns the performance metric data values to the user interface 120 for display.

Figure 7A:
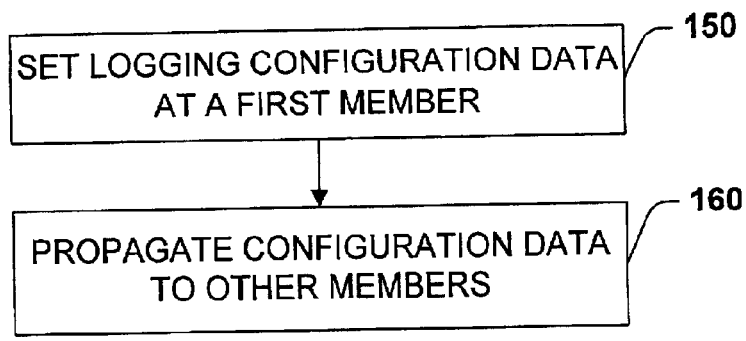
FIG. 7a is a flow diagram illustrating replication in accordance with one aspect of the present invention.
Figure 7B:
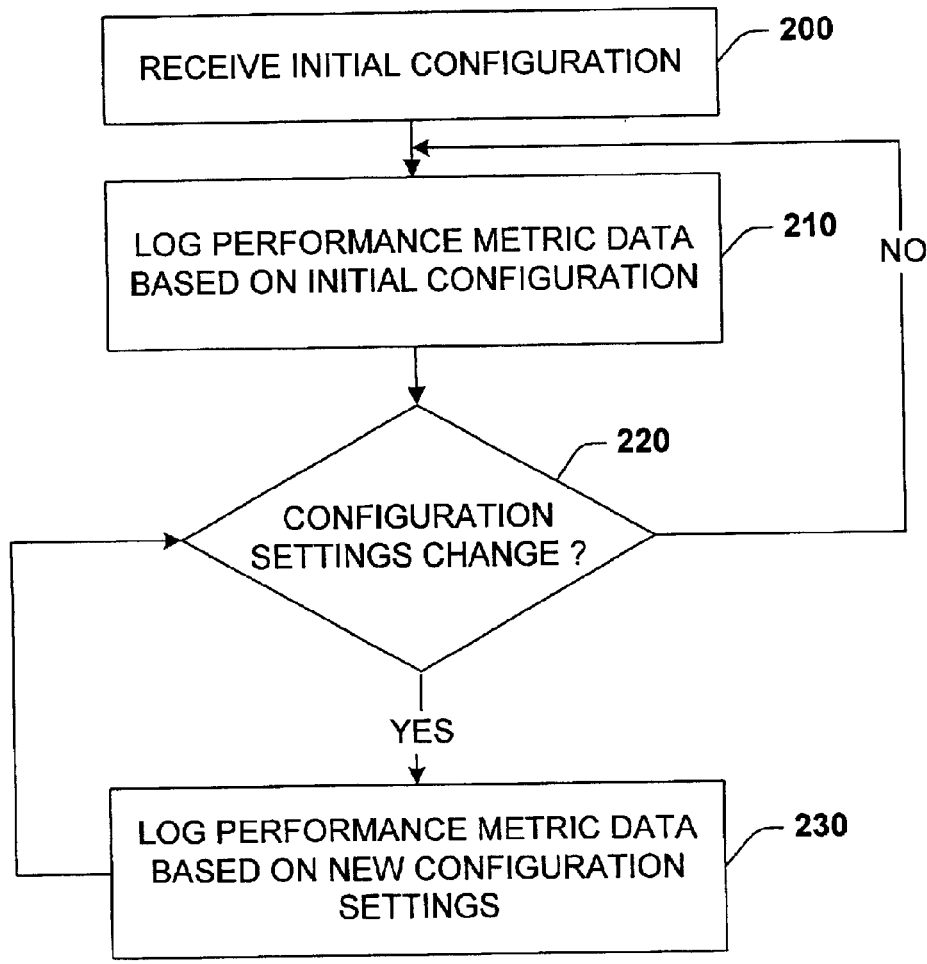
FIG. 7b is a flow diagram illustrating configuration monitoring and data performance logging in accordance with one aspect of the present invention.

FIG. 7a illustrates one particular methodology for providing similar configuration data settings for metrics to be logged at each member of an entity. In step 150, the global configuration settings for the counters to be logged are set at a first member 50. The first member 50 then propagates these global configuration settings to the configuration settings 62 of each member 60 (including the first member 50) by employing the replication engine 52 in step 160. FIG. 7b illustrates one particular methodology for each member in responding to the methodology for providing similar configuration data settings for metrics to be logged at each member of an entity of FIG. 7a. In step 200, the member 60 receives the initial configuration settings and begins logging metric data based on the initial configuration in step 210. In step 220, the performance monitor system 66 monitors if the configuration settings have changed. If the configuration settings have not changed (NO), the performance monitor system 66 continues logging metric data according to the initial configuration in step 210. If the configuration settings have changed (YES), the performance monitor system 66 begins logging metric data according to the new configuration settings in step 230. The performance monitor system 66 then returns to step 220 to determine if any new changes have occurred to the configurations settings.

Figure 8A:
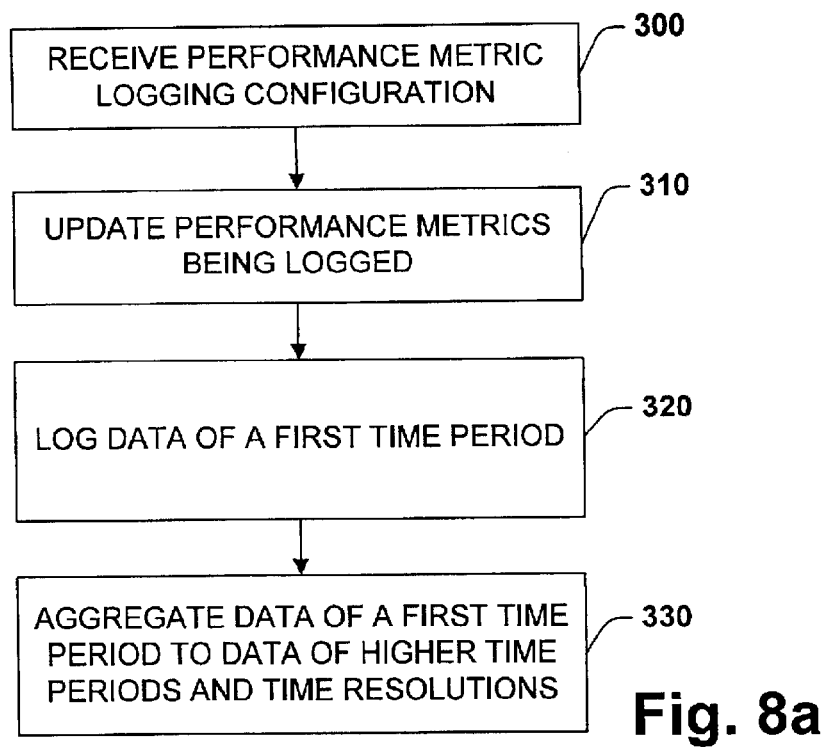
FIG. 8a is a flow diagram illustrating member time aggregation in accordance with one aspect of the present invention.
Figure 8B:
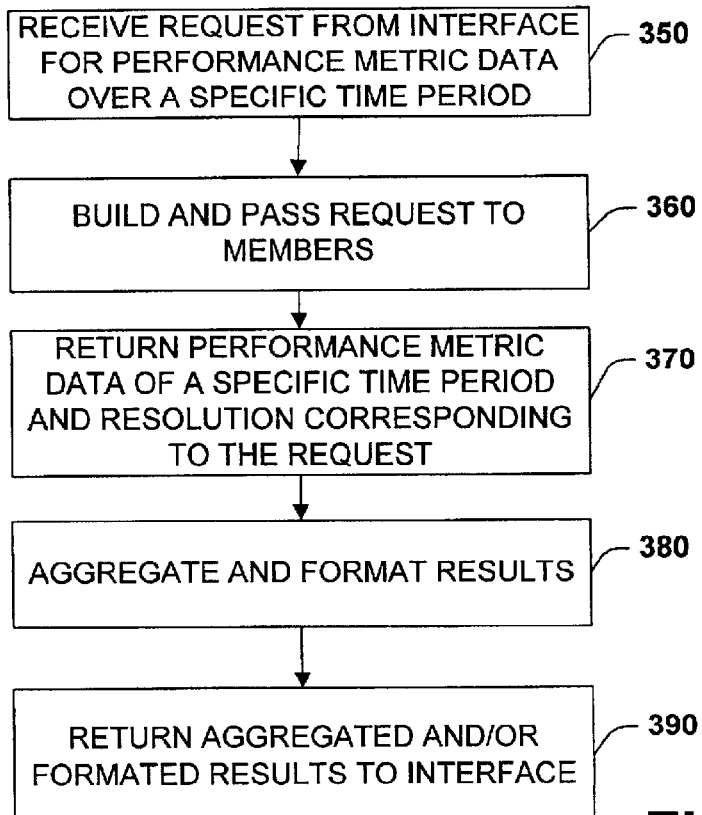
FIG. 8b is a flow diagram illustrating entity performance aggregation in accordance with one aspect of the present invention.

FIG. 8a illustrates one particular methodology for logging and member time aggregation of performance metric data. In step 300, the configuration consumer component 76 receives a metric logging configuration change. In step 310, the configuration consumer component 76 updates the metrics being logged. In step 320, the performance monitor system 66 begins logging the performance data for selected metrics for data sets of a first time period and time resolution. In step 330, the data of a first time period and resolution is aggregated to data sets of higher time periods and resolutions (e.g., 1 minute, 15 minute, 1 hour, 1 day). FIG. 8b illustrates one particular methodology for requesting and receiving performance metric data. In step 350, the performance data gathering and aggregation system 58 receives a request from interface component 56 for performance metric data over a specific time period and time resolution. The request includes an entity specific request and time period or resolution request for the metric to be viewed. In step 360, the data and gathering aggregation system 58 builds and passes the request to the respective members. The results are returned for the requested performance metric data of a data set of a specific time period and resolution from the data stores 64 of the responding members 60, in step 370. In step 380, the data gathering and aggregation system 58 aggregates the performance metric information data values for each data time point and formats the results for the appropriate time resolution. In step 390, the data gathering and aggregation system 58, returns the results to the interface 56.

Figure 9:
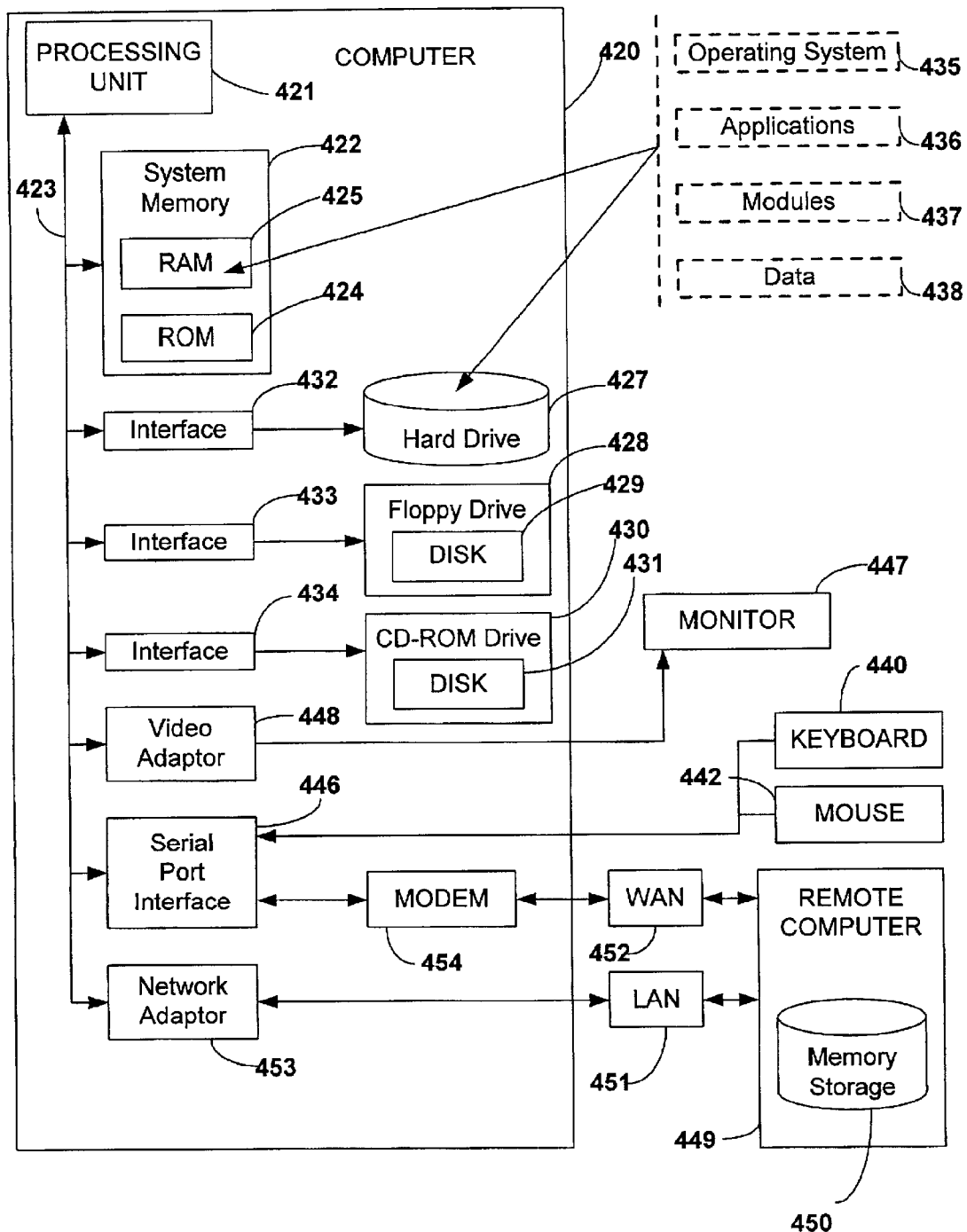
FIG. 9 illustrates a block diagram of a system in accordance with an environment of the present invention.

In order to provide a context for the various aspects of the invention, FIG. 9 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary system for implementing the various aspects of the invention includes a conventional computer 420, including a processing unit 421, a system memory 422, and a system bus 423 that couples various system components including the system memory to the processing unit 421. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multiprocessor architectures also may be employed as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the server computer 420, such as during start-up, is stored in ROM 424.

The computer 420 further includes a hard disk drive 427, a magnetic disk drive 428, e.g., to read from or write to a removable disk 429, and an optical disk drive 430, e.g, for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 425, including an operating system 435, one or more application programs 436, other program modules 437, and program data 438. The operating system 435 in the illustrated computer may be a Microsoft operating system (e.g., Windows NT operating system). It is to be appreciated that other operating systems may be employed such as UNIX for example.

A user may enter commands and information into the server computer 420 through a keyboard 440 and a pointing device, such as a mouse 442. Other input devices (not shown) may include a microphone, a joystick, a game pad, a satellite dish, a scanner, or the like. These and other input devices are often connected to the processing unit 421 through a serial port interface 446 that is coupled to the system bus, but may be connected by other interfaces, such as a parallel port, a game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote client computer 449. The remote computer 449 may be a workstation, a server computer, a router, a peer device or other common network node, and typically includes many or all of the elements described relative to the server computer 420, although only a memory storage device 450 is illustrated in FIG. 9. The logical connections depicted in FIG. 9 include a local area network (LAN) 451 and a wide area network (WAN) 452. Such networking environments are commonplace in offices, enterprise-wide computer networks, intranets and the Internet.

When employed in a LAN networking environment, the server computer 420 may be connected to the local network 451 through a network interface or adapter 453. When utilized in a WAN networking environment, the server computer 420 generally may include a modem 454, and/or is connected to a communications server on the LAN, and/or has other means for establishing communications over the wide area network 452, such as the Internet. The modem 454, which may be internal or external, may be connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 420, unless otherwise indicated. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A performance system for a plurality of members configured as an entity, comprising:
    a performance monitor system for each of the plurality of members, the performance monitoring system monitoring member specific metrics;
    a time aggregation component employed by the performance monitor system to aggregate member metrics over time, and aggregate member specific performance metrics data into data of larger time periods and larger resolutions by taking one of an average, a minimum, a maximum, a last and a weighted average of performance metrics data of a first time period and first resolution to evaluate performance metric data of a consecutive time period and consecutive resolution; and
    a first computer having a gathering and aggregation system that gathers performance metric data from the plurality of members and aggregates the performance metric data into a unified result set.

2. The system of claim 1, wherein each of the plurality of members have gathering and aggregation system such that the unified result set can be gathered and aggregated from any of the plurality of members.

3. The system of claim 1, wherein the plurality of members log member specific operational metrics to a data store corresponding to that particular member.

4. The system of claim 1, the gathering and aggregation system receives a request from a requestor for operational metric information for the entity and returns the unified result set back to the requester.

5. The system of claim 4, the requestor is one of an external process, an internal process, an external consumer, a user interface and another entity.

6. The system of claim 1, the first computer receives a configuration setting defining the operational metric information to be logged, the first computer replicating the configuration setting to the plurality of members.

7. The system of claim 6, wherein any of the plurality of members are configurable to receive a configuration setting defining the operational metric information to be logged.

8. The system of claim 1, wherein the performance gathering and aggregation system aggregates valid operational metric data and compensates for invalid operational metric data.

9. The system of claim 1, wherein the gathering and aggregation system provides a unified result set of operational metric data for a single member.

10. A performance system for a plurality of members configured as an entity, comprising:
    a performance monitor system for each of the plurality of members, the performance monitoring system monitoring member specific metrics; and
    a first computer having a gathering and aggregation system adapted to gather performance metric data from the plurality of members and aggregate the performance metric data into a unified result set, the gathering and aggregation system further comprising a performance entity aggregation component adapted to gather and aggregate performance metric data values of a particular time period and resolution from the plurality of members based on a time period and time resolution requested by a requestor, the data performance values having similar data times to form a unified result set over the particular time period and time resolution by evaluating a single data value for data points of similar data times by taking one of an average, a minimum, a maximum, a last and a weighted average of data of similar data times.

11. The system of claim 10, wherein each of the plurality of members have a gathering and aggregation system such that the united result set can be gathered and aggregated from any of the plurality of members.

12. The system of claim 10, wherein the plurality of members log member specific operational metrics to a data store corresponding to that particular member.

13. The system of claim 10, the first computer being configurable to receive a configuration setting defining the operational metric information to be logged, the first computer replicating the configuration setting to the plurality of members.

14. The system of claim 13, wherein any of the plurality of member are configurable to receive a configuration setting defining the operational metric information to be logged.

15. The system of claim 10, the performance gathering and aggregation system being operable to aggregate valid operational metric data and compensate for invalid optional metric data.

16. The system of claim 10, the gathering and aggregation system being further adapted to provide a unified result set of operational metric data for a single member.

17. A system for monitoring performance metrics of a plurality of members configured as an entity, comprising:
    a first computer having configurable performance metric settings for determining performance metrics to be monitored, each of the plurality of members of the entity having member specific configuration settings wherein selection of performance metrics in the first computer is propagated to the member specific configuration settings of each of the plurality of members; and
    a performance monitor system associated with at least one of the plurality of members operable to log performance metric information based on its member specific configuration settings, the performance monitor system comprising:
        a configuration consumer component to determine settings in the member specific configuration settings and log performance metric information based on the settings, and access a configuration store to create a global list containing performance metrics to be logged to a data store; and
        a metric consumer component communicatively coupled to the configuration consumer component wherein the metric consumer component accesses the global list and retrieves performance metric data firm a metric source based on the performance metrics in the global list and logs the performance metric data to the data store.

18. The system of claim 17, wherein the first computer is a first member of the plurality of members and changes to the configurable performance metric settings at the first member are dynamically updated at the member specific configuration settings of the plurality of members.

19. The system of claim 17, the configuration consumer component being notified of changes in the member specific configuration settings and being operable to access these changes through a configuration store.

20. The system of claim 17, wherein the configuration consumer component defines a time period for the metric consumer component to retrieve performance metric data from the metric source and log the performance metric data to the data store.

21. The system of claim 21, the performance metric data being logged based on a predefined time period to the data store.

22. The system of claim 21, further comprising a member time aggregation component operable to dynamically aggregate the performance metric data being logged based on a predefined time period and time resolution in the data store to data set of larger time periods and larger time resolutions.

23. A method for monitoring performance metrics of a plurality of members configured as an entity, comprising:

setting configurable performance metric settings for determining performance metric types to be monitored;

propagating the performance metric settings to a plurality of remaining members of the entity to establish performance metric configuration settings at the plurality of members;

logging performance metric data at predefined time periods and resolutions at each of the plurality of members based on the performance metric configuration settings at each of the plurality of members; and dynamically updating the logging of performance metric data at each of the plurality of members based on any changes in the performance metric settings.

24. A computer readable medium having stored thereon computer executable instructions for carrying out the method of claim 23.

25. A system for monitoring performance metrics of a plurality of members configured as an entity, comprising:

means for configuring performance metric settings of the entity for determining performance metric types to be monitored;

means for propagating the performance metric settings to the plurality of members of the entity to establish performance medic configuration settings at the plurality of members;

means for logging performance metric data at predefined time periods and resolutions at each of the plurality of members based on the performance metric configuration settings at each of the plurality of members; and means for dynamically updating tho logging of performance metric data at each of tie plurality of members based on any changes in the performance metric settings.

* * * * *